UNITED STATES PATENT OFFICE.

RUSSELL THAYER, OF PHILADELPHIA, PENNSYLVANIA.

PROCESS FOR THE EXTRACTION OF PLATINUM AND SIMILAR METALS FROM THEIR SANDS AND ORES.

1,281,878.   Specification of Letters Patent.   Patented Oct. 15, 1918.

No Drawing.   Application filed March 5, 1918.   Serial No. 220,605.

*To all whom it may concern:*

Be it known that I, RUSSELL THAYER, a citizen of the United States, residing in Philadelphia, in the county of Philadelphia and State of Pennsylvania, have invented a certain new and useful Process for the Extraction of Platinum and Similar Metals from Their Sands and Ores, whereof the following is a specification.

By the term "similar metals" I include such rare metals of the so-called "platinum group" commonly found in nature associated with platinum, as lend themselves to the treatment hereinafter set forth.

The particular sands and ores to which my invention relates are those natural deposits in which the platinum, or similar metal, exists in a condition of exceedingly fine comminution, as distinguished from particles of substantial size. According to my present view, the metal in these sands or ores, may exist in a state of exceedingly minute solid particles of what may be termed the normal metal, or in a colloidal state, or may comprise both conditions.

In sands and ores of the type above referred to the metals occur in association with silicious material, as the predominating ingredient of the entire mass, and for convenience of description, but without restrictive effect, I may refer to such sands and ores as being substantially silicious, and may, for like reasons, include under the generic term ores, the embodiment which is commercially most important, viz: that known mineralogically as sands, or substantially granular material, as distinguished from rocky masses or lumps of a size too large to be called granular. In either instance, however, the material at the time of actual treatment may be considered as granular.

In an application for Letters Patent of the United States heretofore filed by me, Serial No. 186,303, filed August 15, 1917, I have set forth a process for volatilizing platinum and similar metals from ores of the character above described, by the application of heat at a very much lower temperature than the melting point of the metals when in their normal metallic form in masses of substantial size.

The invention which is the subject of the present application is also based broadly upon a similar principle of volatilization of the metal, but under conditions which will now be set forth.

I have discovered that by the addition of a suitable alkali in conjunction with aqueous moisture, to a body of such ore as is above mentioned, in a state of proper mechanical subdivision, either as the same may occur in nature, or such as may be produced by grinding, and by the subsequent application of heat, the platinum may be volatilized and recovered with a maximum degree of completeness, and with great commercial economy in the absence of any other reacting ingredient. Hence the addition of mercury, in conjunction with an alkali metal, (set forth as the preferred method of procedure in my former application) may be entirely dispensed with, and the broad process of volatilization, set forth in such former application, will be rendered very substantially more efficient and economical than would be the case in the absence of the alkaline ingredient.

As a typical instance of a practical application of my present process, but without restrictive intent, I state the following as a preferred method of procedure for the particular type of material specified.

The ore to be treated consists of dry sands from the glacial moraine deposits, occurring in Herkimer county, New York.

For one ton of such dry sands I employ an alkaline solution, preferably composed of about 400 pounds of water, in which are dissolved two pounds of sodium hydroxid. The body of sands is thoroughly intermingled with this solution, preferably by mechanical stirring, so that, practically speaking, the exterior of each grain shall become wetted. The wet mass is then subjected, in a closed retort, to the application of heat, until the contemplated metal has been substantially volatilized. I prefer to apply the heat gradually, and to attain a temperature of from 600 to 900° F., the heating being preferably continued for say two hours.

The effluent end of the retort is connected by an inclosed passage with a suitable receiver in which the steam is condensed and in which the volatilized metal is collected, preferably in a body of water.

When the process has been conducted to the desired extent, the volatilized platinum, or similar metals, can be recovered from the place of detention by any one or more of the well-known methods, such, for instance, as filtration for the recovery of solid particles, precipitation by the use of calcium chlorid or barium chlorid, or coagulation by an addition of aluminum sulfate in case the metal is in a colloidal state. As the treatment or process for the recovery of the metal, after its separation from the ore, is not of the essence of my invention, it is unnecessary to dwell further upon this particular step.

The formula and directions above given may, of course, be varied, even for the specific material referred to, for instance, if the initial material contains a substantial amount of water or aqueous moisture, the amount of water may be reduced.

While sodium hydroxid is described as the preferably alkaline reagent, I would state that this is largely because of the readiness with which it can be procured commercially, and its relative cheapness, but I do not limit myself to the use of any particular alkali.

In case the initial ore is in the form of rock, or contains fragments too large in size to be considered as granular for the purpose of the contemplated treatment, the material should be ground to a suitable mesh, the actual degree of fineness being largely a question of commercial economy.

As before stated, I refer to the ore as "granular", meaning to include not merely material which in its natural state is in that condition, but rock or fragments of substantial size after grinding.

Having thus described my invention, I claim:

The hereinbefore described process for the recovery of platinum and similar metals from granular silicious ore, which consists in diffusing an alkaline solution through a charge of ore; subjecting the wetted mass to heat, in an inclosed receptacle, whereby the metal is volatilized and removed from the ore; and collecting the volatilized metal, substantially as set forth.

In testimony whereof I have hereunto signed my name at Atlantic City, N. J., this second day of March, 1918.

RUSSELL THAYER.

Witnesses:
JOHN J. O'NEILL,
HARRY D. MONTAGUE.